(12) United States Patent
Wills et al.

(10) Patent No.: US 8,412,571 B2
(45) Date of Patent: Apr. 2, 2013

(54) SYSTEMS AND METHODS FOR SELLING AND DISPLAYING ADVERTISEMENTS OVER A NETWORK

(75) Inventors: Anthony Joseph Wills, East Northport, NY (US); Joseph Amedeo Fortuna, Jr., Lake Huntington, NY (US); Michael Fisher, Mount Kisco, NY (US); Yigal Ben Efraim, Kfar (IL); Tami Cohen, New York, NY (US); Teddy Jawde, Brooklyn, NY (US)

(73) Assignee: Advertising.com LLC, Dulles, VA (US)

( * ) Notice: Subject to any disclaimer, the term of this patent is extended or adjusted under 35 U.S.C. 154(b) by 1421 days.

(21) Appl. No.: 12/028,937

(22) Filed: Feb. 11, 2008

(65) Prior Publication Data

US 2009/0204485 A1 Aug. 13, 2009

(51) Int. Cl.
*G06Q 40/00* (2012.01)
(52) U.S. Cl. .................. 705/14.4; 705/14.41; 705/14.43; 705/14.49; 705/14.67
(58) Field of Classification Search ............... 705/14, 705/14.4, 14.41, 14.43, 14.49, 14.67
See application file for complete search history.

(56) References Cited

U.S. PATENT DOCUMENTS

| | | | |
|---|---|---|---|
| 5,796,952 A | 8/1998 | Davis et al. | |
| 5,835,087 A | 11/1998 | Herz | |
| 5,835,712 A | 11/1998 | DuFresne | |
| 5,870,559 A | 2/1999 | Leshem et al. | |
| 5,905,862 A | 5/1999 | Hoekstra | |
| 5,933,822 A | 8/1999 | Braden-Harder et al. | |
| 5,948,061 A | 9/1999 | Merriman et al. | |
| 5,958,008 A | 9/1999 | Pogrebisky et al. | |
| 5,983,237 A | 11/1999 | Jain et al. | |
| 5,987,457 A | 11/1999 | Ballard | |
| 6,035,332 A | 3/2000 | Ingrassia, Jr. et al. | |
| 6,078,866 A | 6/2000 | Buck et al. | |
| 6,078,916 A | 6/2000 | Culliss | |
| 6,169,986 B1 | 1/2001 | Bowman et al. | |
| 6,256,633 B1 | 7/2001 | Dharap | |
| 6,269,361 B1 | 7/2001 | Davis et al. | |
| 6,308,202 B1 | 10/2001 | Cohn et al. | |
| 6,356,899 B1 | 3/2002 | Chakrabarti et al. | |
| 6,366,298 B1 | 4/2002 | Haitsuka et al. | |
| 6,370,527 B1 | 4/2002 | Singhal | |

(Continued)

FOREIGN PATENT DOCUMENTS

| | | |
|---|---|---|
| WO | WO 00/68839 | 11/2000 |
| WO | WO 00/75814 | 12/2000 |

(Continued)

OTHER PUBLICATIONS https://www.google.com/adsense/overview, "Unleash the full revenue potential of your website with Google Adsense", Jan. 14, 2004, 3 pages.

(Continued)

*Primary Examiner* — Jagdish Patel
*Assistant Examiner* — Kevin Poe
(74) *Attorney, Agent, or Firm* — Finnegan, Henderson, Farabow, Garrett & Dunner LLP

(57) ABSTRACT

Systems and methods are provided for selling one or more advertisements and displaying the one or more advertisements a fixed placement for a set duration of time on a web page within an Internet website in combination with displaying advertisements from the same advertiser in contextually relevant locations within the website.

25 Claims, 4 Drawing Sheets

U.S. PATENT DOCUMENTS

| | | | |
|---|---|---|---|
| 6,442,529 B1 * | 8/2002 | Krishan et al. | 705/14.52 |
| 6,453,315 B1 | 9/2002 | Weissman et al. | |
| 6,523,026 B1 | 2/2003 | Gillis | |
| 6,526,440 B1 | 2/2003 | Bharat | |
| 6,668,256 B1 | 12/2003 | Lynch | |
| 6,704,727 B1 | 3/2004 | Kravets | |
| 6,754,873 B1 | 6/2004 | Law et al. | |
| 6,876,997 B1 | 4/2005 | Rorex et al. | |
| 7,007,074 B2 | 2/2006 | Radwin | |
| 7,174,346 B1 | 2/2007 | Gharachorloo et al. | |
| 7,231,399 B1 | 6/2007 | Bem et al. | |
| 7,249,121 B1 | 7/2007 | Bharat et al. | |
| 7,685,197 B2 * | 3/2010 | Fain et al. | 707/732 |
| 2002/0010625 A1 | 1/2002 | Smith et al. | |
| 2002/0107735 A1 | 8/2002 | Henkin et al. | |
| 2002/0123912 A1 | 9/2002 | Subramanian et al. | |
| 2002/0143630 A1 * | 10/2002 | Steinman et al. | 705/14 |
| 2003/0036979 A1 * | 2/2003 | Tokorotani | 705/27 |
| 2003/0088554 A1 | 5/2003 | Ryan et al. | |
| 2004/0059708 A1 * | 3/2004 | Dean et al. | 707/1 |
| 2004/0172389 A1 | 9/2004 | Galai et al. | |
| 2004/0177015 A1 | 9/2004 | Galai et al. | |
| 2004/0181525 A1 | 9/2004 | Itzhak et al. | |
| 2004/0267725 A1 | 12/2004 | Harik | |
| 2005/0065806 A1 | 3/2005 | Harik | |
| 2005/0149499 A1 | 7/2005 | Franz et al. | |
| 2005/0267872 A1 | 12/2005 | Galai et al. | |
| 2008/0013916 A1 * | 1/2008 | Sharpe et al. | 386/52 |
| 2009/0018911 A1 * | 1/2009 | An Chang et al. | 705/14 |
| 2010/0138307 A1 * | 6/2010 | White | 705/14.71 |
| 2010/0198684 A1 * | 8/2010 | Eraker et al. | 705/14.49 |

FOREIGN PATENT DOCUMENTS

| | | |
|---|---|---|
| WO | WO 01/44882 A1 | 6/2001 |
| WO | WO 01/44992 | 6/2001 |
| WO | WO 02/37220 | 5/2002 |
| WO | WO 03/012576 | 2/2003 |
| WO | WO 03/017023 | 2/2003 |
| WO | WO 2004/010331 | 1/2004 |
| WO | WO 2004/111771 | 12/2004 |
| WO | WO 2005/119423 | 12/2005 |

OTHER PUBLICATIONS

International Search Report for Application No. PCT/IL/02/00669, Jun. 11, 2003, 4 pages.

International Search Report for Application No. PCT/IL02/00616, Aug. 21, 2003, 4 pages.

International Search Report for Application No. PCT/IL03/00598, Nov. 5, 2003, 4 pages.

International Search Report for Application No. PCT/US05/018996, May 17, 2007, 3 pages.

Office Action dated Mar. 6, 2007 issued by USPTO in commonly-owned U.S. Pub. No. 2005/0267872, 11 pgs.

Search Report for commonly-owned European Patent Application No. 02755591.1, 5 pages.

Bharat K. et al.: "A technique for measuring the relative size and overlap of public Web search engines" Computer Networks and ISDN Systems, North Holland Publishing, Amsterdam, NL; vol. 30, No. 1-7, Apr. 1998, pp. 379-388.

Hirai J. et al.: "WebBase: a repository of Web pages" Computer Networks, Elsevier Science Publishers B.V., Amsterdam, NL; vol. 33, No. 1-6, Jun. 2000, pp. 277-293.

Office Action issued in U.S. Appl. No. 10/485,108, dated Jan. 25, 2006 (19 pages).

Office Action issued in U.S. Appl. No. 10/485,108, dated Oct. 19, 2006 (8 pages).

Advisory Action issued in U.S. Appl. No. 10/485,108, dated Jan. 18, 2007 (3 pages).

Office Action issued in U.S. Appl. No. 10/485,108, dated May 14, 2007 (8 pages).

Final Office Action issued in U.S. Appl. No. 11/069,686, dated Sep. 4, 2007 (10 pages).

Office Action issued in U.S. Appl. No. 11/069,686, dated Oct. 9, 2007 (10 pages).

Office Action issued in U.S. Appl. No. 11/069,686, dated Mar. 26, 2008 (11 pages).

Final Office Action issued in U.S. Appl. No. 11/069,686, dated Sep. 16, 2008 (13 pages).

* cited by examiner

SYSTEMS AND METHODS FOR SELLING AND DISPLAYING ADVERTISEMENTS OVER A NETWORK

FIELD OF THE INVENTION

The present invention relates generally to systems and methods for displaying advertisements over a network and, more particularly, to systems and methods for selling one or more advertisements and displaying the one or more advertisements in a fixed placement for a duration of time on a web page within an Internet website in combination with displaying advertisements from the same advertiser in contextually relevant locations within the website.

BACKGROUND OF THE INVENTION

Advertisements are often displayed in a web page in response to a user typing the Universal Resource Locator ("URL") for that web page into a web browser or selecting a link for the web page from a list of search results. Typically, each advertisement is associated with a single adviser and may include text and/or graphics and/or audio. Upon selection of an advertisement (e.g., left click with a mouse or rolling over the area with a pointer), the web browser can be redirected to a web page associated with the advertisement from which the user can, for example, receive additional information, place online orders, or complete other transactions. Advertisements are typically sold based on a set fee, a cost-per-click (CPC), or a cost-per-thousand (CPM) viewers.

Advertisements can be displayed in a web page in a variety of ways. An advertiser can elect to place the advertisement(s) within a given web page. However, if the advertisement is not effective on that selected web page the advertiser's only recourse is to stop advertising on that page and find a new web page on which to advertise.

Alternatively, advertisements can be selected for display within a web page substantially in real time, based on demographical information of a particular user who is accessing the web page. However, this approach for selecting and displaying advertisements is often perceived as intrusive of the user's privacy and may be ineffective when the web page provider has insufficient information regarding the user's demographics.

Advertisements may also be displayed on a particular web page or in a particular location on a web page based on subject matter displayed on that page. However, once the information on that page changes so will the advertisement. The idea according to both of these latter approaches is that end-users are more likely to "click-trough" or otherwise respond to advertisements that are closely related to the user's interests and characteristics.

The above strategies work well in many situations, such as for national and international advertising campaigns but they are not especially effective for local advertising. Local advertisers are typically averse to actively managing Internet advertising campaigns, yet they are concerned about where and when their advertisements are served. They also want the most effective advertising campaign that they can afford.

In view of the foregoing, it would be advantageous to provide an improved system and method for selling and displaying advertisements over the internet.

SUMMARY OF THE INVENTION

Embodiments of the present invention provide systems and methods for selling and placing advertisements ("ads") over a communications network. The advertisements can be sold and displayed as a combination of fixed placement advertisements and contextually relevant advertisements.

An aspect of the invention provides for the sale and display of ads over a network. The system may include a database configured to store at least one advertisement from an advertiser and an advertisement selection application. The advertisement selection application receives a request for advertising from a user computer that is attempting to access a website. In response to the request, the advertisement selection application selects an advertisement of an advertiser from the database for display in a fixed location within a web page of the website. It also selects another advertisement of said advertiser from the database for display in a location within the website that is contextually relevant to that advertisement.

Another aspect of the invention provides a system for responding to a request over a network for access to a web page. The system includes a content publisher/provider that receives a request from a user computer for access to a web page. In response to the request, the content provider transmits both content for the page and instructions to the user computer. The instructions direct the user computer to request advertising from an advertisement selection system. The instructions also include information about at least one location on the web page for a fixed placement advertisement. The instructions also include information about at least one location for a contextually relevant advertisement.

Embodiments of the invention include a method for selecting and displaying advertisements within a website. The website includes at least one web page. The method includes storing advertisements from an advertiser and receiving a request for at least two of the stored advertisements. In response to the request, the method includes selecting at least one of the stored advertisements of the advertiser for display within a fixed location on a page of the website and selecting another of the stored advertisements of the advertiser for display in a contextually relevant location within the website.

In another aspect of the present invention, a system and corresponding me are provided for selecting and displaying advertisements over a communications network. The system includes a database configured to store an advertiser's advertisements, which are designed to be displayed on a content provider's website. The invention also includes an advertisement selection module for receiving a request for advertising from a user computer and selecting at least one of the advertiser's advertisements from the database for display in a fixed location within a page of the website. The advertisement selection module also selects one of the advertiser's advertisements from the database for display in a location within the website that is contextually relevant to that advertisement.

In still another aspect of the present invention a method is provided of selling advertising for a website of a content provider over network. The method includes creating a package of advertisements which includes a fixed placement advertisement and a contextual advertisement. The fixed placement advertisement includes a location on a website available for purchase to display an advertisement and the contextual advertisement includes a guarantee to display an advertisement within the same website at a location that is contextually relevant to that advertisement. This package is offered for purchase via the network.

BRIEF DESCRIPTION OF THE DRAWINGS

For a better understanding of the present invention reference is made to the following description, taken in conjunction with the accompanying drawings, in which like reference characters refer to like parts throughout, and in which.

DETAILED DESCRIPTION OF THE INVENTION

Figure 1:
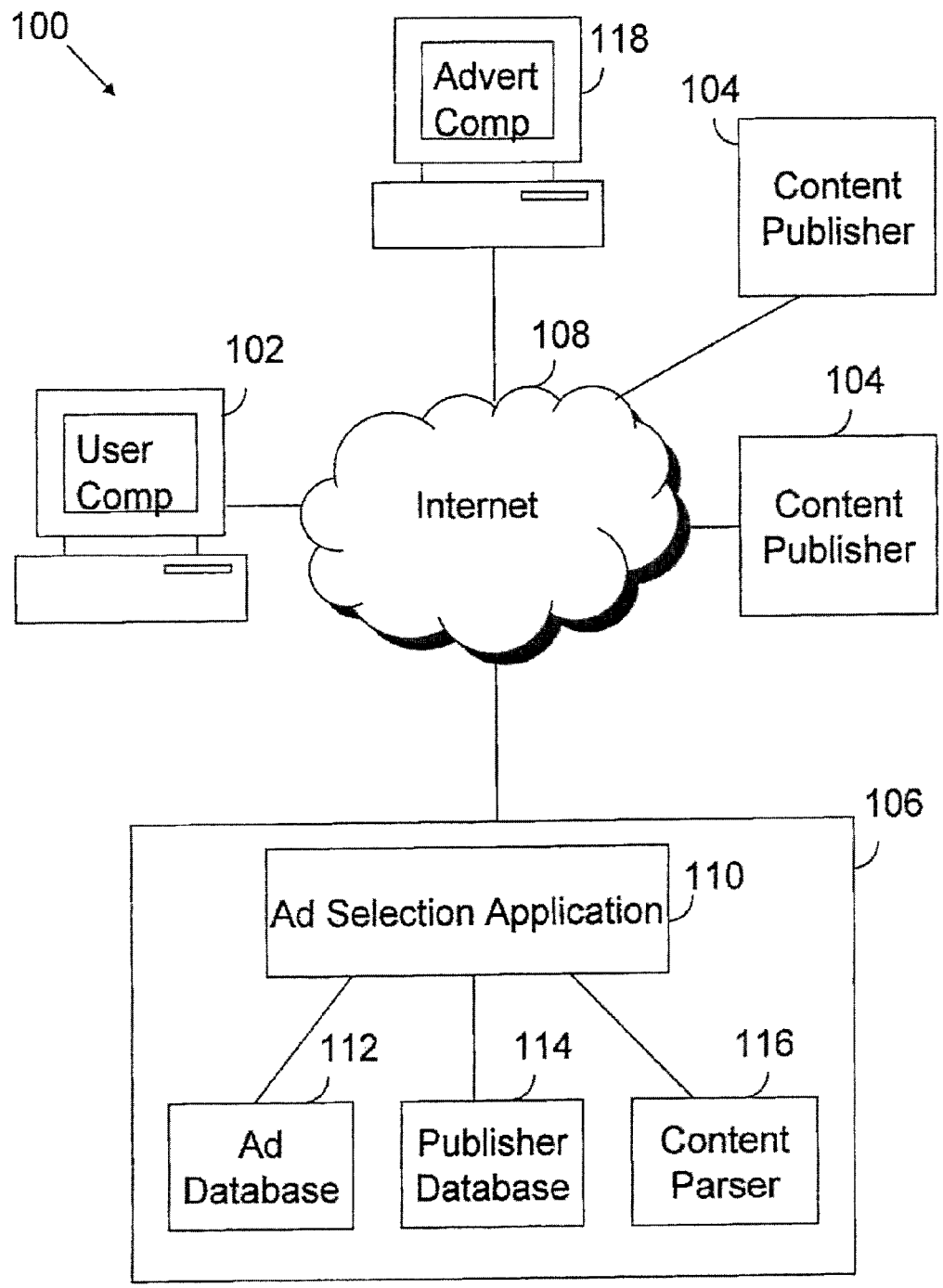
FIG. 1 is a block diagram of a system for selling advertisements and displaying them over a network (e.g., Internet) in accordance with an embodiment of the present invention.

Embodiments of the present invention relate to systems and methods for selling and displaying advertisements on a network. While this invention is applicable to many types of networks, an example of a suitable network is the Internet. For ease of explanation, the remainder of the description shall be limited to the Internet. However, those skilled in the art will recognize that the description could be applied to other types of networks as well.

The advertisements may include text graphics, sound, video, or any combination thereof. For ease of explanation, the following description shall be limited to text and graphics and combinations thereof. However, those skilled in the art will recognize that the same or a similar description can be applied to the other advertisement formats.

Advertisements for sale and display include a combination of a fixed placement advisement and a contextually relevant advertisement. The fixed placement advertisement is an advertisement that typically will be located on the same page of the website for the duration of the advertising agreement. While it is preferable that the location on that page also remains stationary for the duration of the agreement, those skilled in the art will recognize that the location on that page could change on one or more subsequent visits to that page and still fill within the scope of the present invention. Those skilled will also recognize that the advertisement could be displayed on a different page of the website during one or more subsequent visits to that web site and still fall within the scope of the invention.

The context relevant portion of the combination preferably includes only text, although it could include another format or a combination of formats without departing from the scope of the invention. The contextually relevant advertisement(s) could include one or more instances of a highlighted word or words that are associated with hyperlinks to web pages where the consumer has the option to view additional information related to the advertisement or to make a purchase etc. Preferably there will be a guaranteed number of these contextual advertisements, such as 100,000 impressions per month, displayed throughout the website during the term of the advertising armament. While 100,000 impressions are preferable it is in no way required and not intended to be limiting on the scope of the invention. There could betas few as 1 additional impression or any number of additional impressions. Further, the time period need not be limited to 1 month; any period of time could be employed. Alternatively, or in addition, some or all of the contextual advertisements may be displayed for as long as they are relevant then not displayed again and some or all of the contextual advertisements may be redisplayed elsewhere in the website where they are contextually relevant, either simultaneously with or subsequent to the display of the first contextual advertisement. Further, it is possible, but not preferred, that the contextually relevant advertisement could be displayed only until it is selected. Additionally, the contextually relevant advertisements could be selected from a set of advisements from the advertiser, which allow different advertisements to be associated with different information in the website. Those skilled in the art will recognize that contextual relevance could refer to a few words, a sentence, a few sentences, a paragraph, a webpage or even a particular section of the website.

FIG. 1 is a block diagram of a system 100 for selling advertisements for display over a network (e.g., the internet) in accordance with an embodiment of the present invention. System 100 includes user computer(s) 102, content publishers 104, advertisement ("ad") system 106 and advertiser computer 118 that communicate with one another over network 108. While advertiser computer 118 has been illustrated as a separate device for ease of explanation, it will be apparent that an advertiser may simply employ a user computer 102 to access the system. Each of user computer(s) 102, advertiser computer 118, content publishers 104, and ad system 106 may be in electrical communication with internet 108 via a suitable communications capability such as a cable or satellite connection, a local area network ("LAN"), or any other suitable wired, wireless, or optical connection, or a combination thereof.

User computer 102 and advertiser computer 118 may be any suitable computing equipment for accessing content (e.g., web pages) over internet 108 and displaying advertisements to end user(s). For example, as shown in FIG. 1, computers 102 and 118 may be a desktop computer. In other examples, computers 102 and 118 may be a laptop computer, telephone (e.g., mobile phone), personal digital assistant ("PDA") such as a BlackBerry™ or Trio™ device, or any other suitable computing device. Computers 102 and 118 may have a web browser (e.g., Internet Explorer™, Netscape Navigator™, Mozilla Firefox™, etc.) operating thereon for facilitating communications over internet 108. The web browser may access and read marked-up documents (e.g., HTML documents) from content publishers 104 and then translate and render those documents into web pages that can be viewed by end users at computers 102 and 118. Typically, system 100 will include multiple user computers 102 and advertiser computers 118 although only one user computer 102 and advertiser computer 118 are shown in FIG. 1 to avoid overcomplicating the drawing.

A content publisher 104 may be any publisher of web page(s) over internet 108. For example, a content publisher 104 may be the computing system responsible for publishing the web pages viewable at http://www.nydailynews.com. Another content publisher may be the computing system responsible for publishing the web pages viewable at http://www.nypost.com. Each content publisher 104 may include one or more web servers for receiving and responding to requests from user computers 102 for access to the web page (s) provided by the content publisher. Somebody employing user computer 102 may request access to a given web page by entering a Universal Resource Locator ("URL") for that web page into an address region of a web browser display or by selecting a link for the web page from a list of search results (e.g., Google search results).

Figure 4:
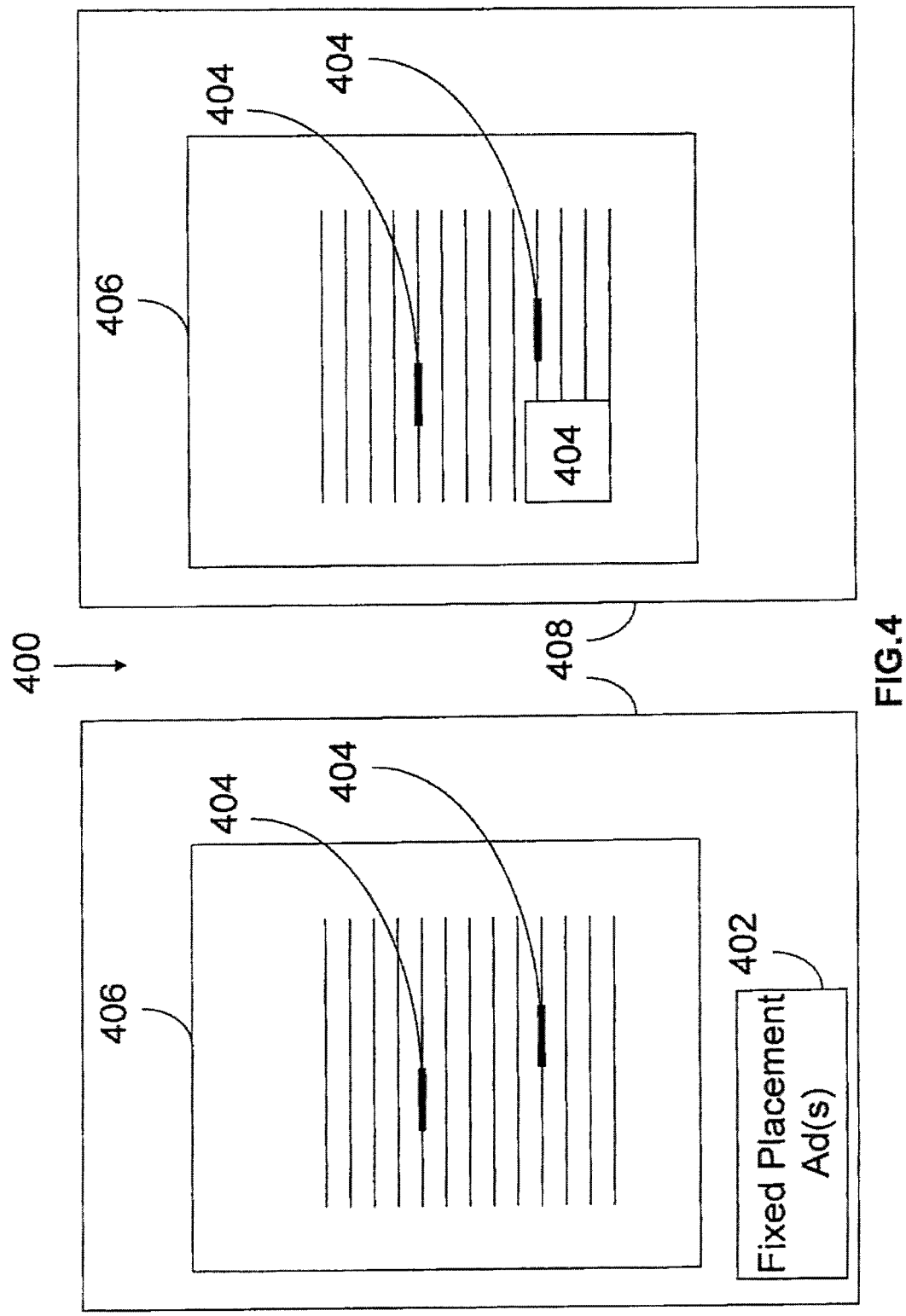

Ad system 106 may include ad selection application 110, ad database 112, publisher database 114, and content parser 116. While the description employs the database, those skilled in the art will recognize that any sufficient form of organized storage could be employed and still fall within the scope of the invention. Ad selection application 110 may include any suitable hardware, software, or combination thereof for receiving and responding to requests for advertisements received by ad system 106 via Internet 108. For example, ad selection application 110 may include one or more web server(s). Responsive to the requests, ad selection application 110 may select and transmit one or more fixed placement advertisements 402 (FIG. 4) and one or more contextually relevant advertisements 404 (FIG. 4) for display within web pages provided by a content publisher 104. Ad selection application 110 may select a contextually relevant ad 404 for display within the web pages based on its association with the fixed placement advertisement 402 and relevance of the ad to the content of the web pages and/or past performance of the ad (or similar ads) upon placement within web pages by ad system 106, or a combination thereof.

Ad database 112 may store advertisement(s) for display within web pages provided by content publishers 104 and accessed by user computers 102. Ads stored in database 112 may be downloaded from advertiser(s) over Internet 108 or received by ad selection system 106 according to any other suitable approach (e.g., uploaded from portable storage media provided by the advertisers). Alternatively or additionally, ad database 112 may store information associated with the advertisements including, for example, topics/themes (e.g., for determining relevance of the ads to given web pages), associated text and/or graphic(s) (e.g., for simultaneous or separate display), information regarding past performance of the advertisement (e.g., number of click-throughs), associated advertiser identifiers (e.g., for linking to billing information for the advertisers and for linking to other advertisements for the same advertiser), bid and/or purchase amounts by the advertisers, and/or other criteria regarding the display of the ads within web pages provided by content publishers 104 (e.g., an identification of one or more web pages in which a given ad is eligible for display). As used herein, a theme or topic refers to the contextual gist of content (e.g., advertisement or web page). Illustrative examples of themes/topics are "San Francisco 49ers", "Airplane Accident", and "Bahamas Travel".

Publisher database 114 may store information regarding content publishers 104 within system 100 such as information identifying the web pages provided by content publishers 104 (e.g., a list of their respective URLs), information regarding the content (e.g., topics/themes) of those web pages, information regarding advertisements displayed previously on those web pages and/or the revenue generated therefrom. Alternatively or additionally, publisher database 114 may store information regarding preferences of content publishers 104 such as information regarding the types of advertisements eligible for display on the web pages provided by content publishers 104 and/or information regarding the placement of those advertisements within the web pages (e.g., location, format, and size). In the embodiment illustrated in FIG. 1, ad database 112 and publisher database 114 are separate. However, the same database could be employed for both purposes without departing from the scope of the invention.

Content parser 116 may include any suitable hardware software or combination thereof for parsing web pages provided by content publishers 104 and identifying topic(s)/theme(s) or other indicia associated therewith. Content parser 116 may read publisher's content and relate it through semantic vectors to one or more topic(s)/theme(s) with an associated relevancy score. For example, a page of content provided by Publisher A may be determined to be about "Travel" with a relevancy of 1.0 (100%), "Vacations" with a relevancy of 0.86 (86%), "Cruises" with a relevancy of 0.72 (72%) and "Live Entertainment" with a relevancy of 0.51 (51%). The topics/themes and associated relevancy outputs of content parser 116 may provide specific ad placement opportunities for ads associated with the fixed placement advertisement 402. The parsed information may be used by ad application 110 to select ad(s) that are most or very relevant to the identified topic(s)/theme(s) for placement within the web pages.

Content parser 116 may be configured to return a maximum number (e.g., 10) of themes/topics associated with each page. Alternatively, there may be a different number or no limit to the number of themes/topics that can be identified by content parser 116. Content parser 116 may return a ranked list of themes/topics that identifies the themes/topics in order of greatest to least relevant to the contents of the web page (e.g., such that ads associated with the most relevant theme/topic are more likely to be displayed earlier in a sequence of ads selected by system 106 for display). Those skilled in the art will recognize that other orders are equally useful and may be employed. In embodiments of the invention, content parser 116 may operate substantially in real-time, whereby web pages are parsed at substantially the same time they are accessed by user computers 102. In embodiments of the invention, content parser 116 may parse the web pages periodically, continuously, or according to any other suitable approach (e.g., automatically upon receipt of an electronic notification from a content publisher 104 that the content of the web page(s) has changed or under the control of an operator associated with ad system 106). In various embodiments, content parser 116 may be activated selectively by ad system 106, based on a determination of the best yield between "hard match" (i.e., selecting ads specifically intended for placement within given web pages or sections thereof) and/or semantic matching facilitated by content parser 116. In some embodiments, when ad system 106 determines suitable ad(s) to display on a given page provided by a content publisher 106, system 106 may take into account relevancy, effective bid (e.g., the actual price paid for a click given market dynamics), max bid price (willingness to pay), past performance, other criteria, or combinations thereof as they relate to that specific page.

Ad system 106 may establish relationships with one or more content publishers 104 in order to allow system 106 to place ads within the web pages provided by the publishers upon access of the pages by user computers 102. In some embodiments, video ad system 106 may limit the content publishers 104 that are permitted to associate with system 106 to "premium" publishers such as, for example, providers of web pages that typically receive a minimum number of visits per period (e.g., day, portion of day, month, year). One or more threshold criteria may be established that govern whether a given content publisher is permitted to be associated with ad system 106. This may increase the willingness of advertisers to place their ads through ad system 106 and increase the revenue that can be derived per ad placement and/or subsequent action (e.g., click-through) by an end user of user computer 102.

Establishing a relationship with a content publisher 104 may include negotiating a revenue-sharing arrangement between the ad system 106 and content publisher 104 for revenue generated as a result of displaying ads within the web pages and/or subsequent actions of end-users of user computers 102. Alternatively or additionally, establishing a relationship with a content publisher 104 may include managing interoperability between system 106 and the content publisher to, for example, minimize the latency perceived by end-users of user computers 102. Managing system interoperability may include establishing a protocol for communications upon access of the web pages by end users of user computers 102 (e.g., communications between content publisher 104/user computer 102, user computer 102/ad system 106, and/or content publisher 104/ad system 106).

Figure 2:
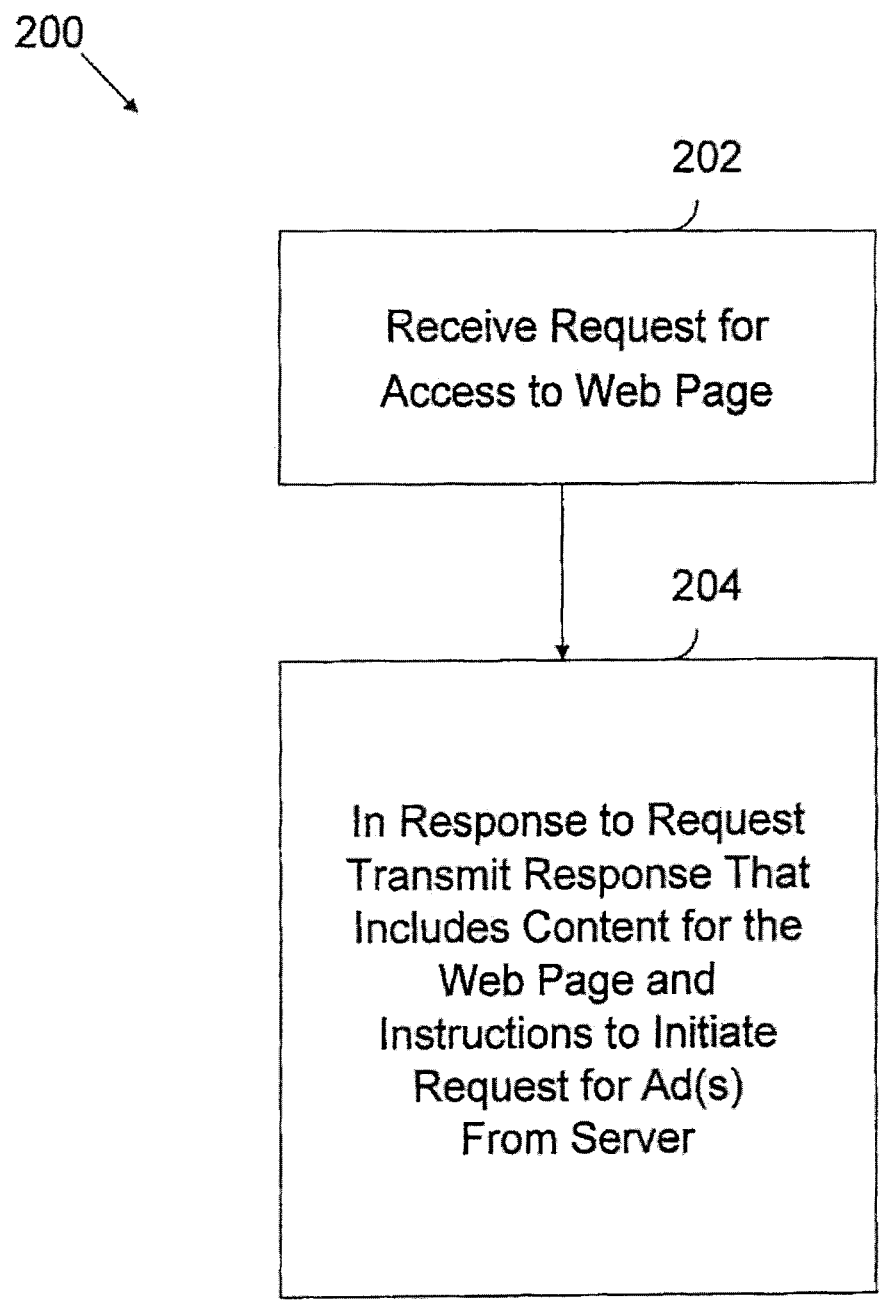
FIGS. 2-3 are flowcharts of illustrative stages involved in the sale and display of advertisements within pages (e.g., web pages) over a network in accordance with embodiments of the present invention; and, FIG. 4 illustrates two pages of a website showing possible locations for fixed placement and contextually relevant advertisements.
Figure 3:
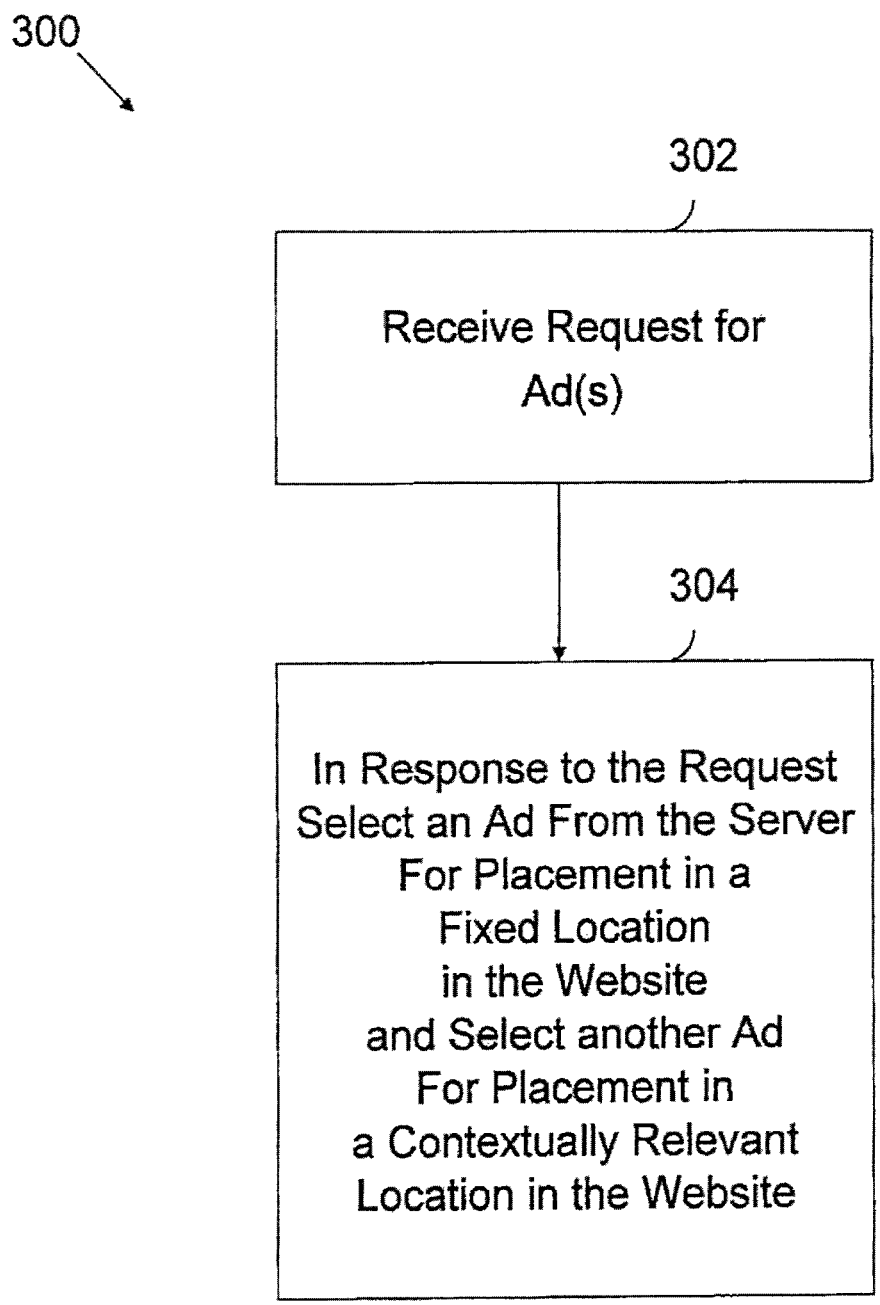

FIGS. 2 and 3 are flowcharts illustrating stages involved in selection and display of ads within web pages in accordance with various embodiments of the present invention. FIGS. 2 and 3 show an embodiment of a communications protocol between a user computer 102 and content provider 104 (FIG. 2), and subsequently between user computer 102 and ad system 106 (FIG. 3), that may be employed upon a request by user computer 102 for access to a web page provided by content publisher 104. Referring to FIG. 2, at stage 202 a request for access to a web page may be received. For example, a web server associated with content publisher 104 may receive HTTP (Hypertext Transfer Protocol) request for access to a web page provided by the publisher from a web browser operating on user computer 102. At stage 204, content publisher 104 may transmit a response (e.g., HTTP response) to the requesting user computer 102, where the response includes both content for the requested web pa as well as instructions to initiate a request for ad(s) from ad system 106. The content and/or instructions may be received by user computer 102 in the form of markup code, which may be translated and processed by the web browser operating on user computer 102. Preferably, the markup code is structured such that user computer 102 sends the request for ads to system 106 at substantially the same time as or even before user computer 102 translates the markup code necessary for rendering the web page display. If the web page is at least partially displayed before the ad(s) are received from ad system 106 (e.g., when ads database 112 does not include any advertisements suitable for display within the web page), the markup code may provide a message or other content (e.g., advertisement) for display within the region of the web page otherwise reserved for the ad. A request for an advertisement may be initiated by a user computer 102 or from content publisher 104 to ad system 106.

Referring to FIG. 3, at stage 302 a request for ad(s) may be received, wherein the request may include one or more ad selection criteria (e.g., location, size, and/or format of the ad within a web page). For example, ad system 106 may receive a request for ad(s) from user computer 102, which request is formatted in accordance with the instructions received by user computer 102 from content publisher 104 at stage 204 (FIG. 2). Other examples of ad selection criteria that may be included in the request received by ad system 106 at stage 302 may be the identity of the content publisher, specific web page accessed (e.g., identified by URL), and/or end-user demographic data and/or preferences (e.g., provided by content provider 104 the instructions sent to user computer 102 through the use of cookies by content provider 104, or maintained locally by user computer 102). At stage 304, an ad, or a set of ads, may be selected in accordance with the ad selection criteria and/or one or more additional criteria such as relevance, past performance, association with the same advertiser, or a combination thereof. At stage 306, the selected ad(s) may be transmitted for display within a web page. The ads displayed within the web page may be at least partly interactive. For example, in response to an end user selecting an ad the web browser operating on user computer 102 may be redirected to a website of the advertiser.

To select ad(s) for placement within pages, ad selection application 110 may evaluate at leas one of relevancy (determined by semantic analysis of a page of content including metadata, actual content, supporting graphics and names, etc.), maximum willingness to pay, past performance of a listing (e.g., by time of day, day of week, and week of year of that listing on that page), association with the fixed placement advertisement, other criteria, and actual price paid based on supporting market data such as the use of a second-price auction approach. Each value may be given a weight which can cause it to be excluded from calculation or weighted superordinarily compared to its peers on an individual page basis. Each value can also be used as a pre-filter prior to evaluation. For example, the system can exclude all candidate listings having bidded topics less than 86% relevant to a page. Alternatively or additionally, the system can exclude any listing having an actual price paid less than $0.50, having a max willingness to pay less than $1.00 and/or having a past performance less than 0.01% for that time of day. Of course, it will be understood that the actual numbers/thresholds will be a design choice configurable and selectable by one of ordinary skill in the art.

When ad selection application 110 selects a sequence of ads for display within a web page, the sequence may be ordered, for example, randomly or based on data associated with past performance, bid prices, relevance to identified topics/themes or a combination thereof. When ad system 106 determines suitable ad(s) to display on a given page provided by a content publisher 106, system 106 may take into account relevancy, effective bid (e.g., the actual price paid for a click given market dynamics), max bid price (willingness to pay), past performance, association with fixed placement ad(s), other criteria, or combinations thereof as they relate to that specific page. Alternatively or additionally, the selection can be based on characteristics for individual listings (ads). For example, an individual URL for a publisher page may consist of a single news article generated on that day. That page can be set up to calculate yield based on the relevance of listings to that topic multiplied by the customers' willingness to pay (max bid price). On another page, for a related news article, the yield score may just be calculated on the effective cost of the ad multiplied by its past performance on that page, its effective cost per click, the max willingness to pay, and its relevancy. Each page in a site may be configurable in the calculation of the yield product and each component of the yield product has an associated value with it that allows that component to be "weighted" for each page. The publisher as a whole (e.g., an entire website) may have values that are inherited or considered to be the default for the entire website until such time as those values are overridden on a per page or per section basis.

The operation of various embodiments of the invention will now be described in relation to FIGS. 1-4. An advertiser operating from advertiser computer 118 accesses ad system 116 either directly via the Internet 108 or via a content publisher 104. Alternatively, the advertiser contacts an entity that controls ad system 106 or some third party and that entity performs the actions on behalf of the advertiser. Subsequent to or simultaneous with accessing ad system 106 the advertiser is provided the option to purchase an advertisement package that includes a combination of a fixed placement advertisement 402 and a contextually relevant advisement 404.

In a preferred embodiment, only one package is offered and purchased. That package is offered and sold for a set fee. Alternatively, the fee is determined through an auction or by some other type of offering. Additionally, there could be multiple different packages. For example a package could include multiple fixed placement ads 402 and only a single contextually relevant ad 404, another package could include a single fixed placement ad 402 and multiple contextually relevant ads 404 and another could include multiple fixed placement as 402 and multiple contextually relevant ads 404. A package and/or its price could be based on the location of the fixed placement ad(s) 402 or the number and/or location of contextually relevant ad(s) 404. For example a package could include a fixed placement ad 402 located on the first page of the website and another package with a fixed placement ad 402 located on a page other than the first page. A package could include a fixed placement ad 402 whose location cages on subsequent visits to the web site, wherein such changes could be random or predetermined and the frequency of the change could be every time the website is accessed, or some other frequency. For example the placement of the fixed placement ad 402 could cycle sequentially through every page of the website with the location change taking effect every time the website is newly accessed. Another package could include a fixed placement ad 402 that is simultaneously repeated on multiple pages of the website. Those skilled in the art will recognize that the exemplary cycle rate and location of the fixed placement ad(s) 402 are design choices and are in no way intended to limit the scope of the invention.

The contextually relevant ad(s) 404 portion of a package could provide ad(s) which are located directly within the text of a webpage or in a separate section devoted to such ads 404, which is located proximal to contextually relevant portions of the web page. These differences could be taken into account when determining a package price. Additionally, the number of contextually relevant ads (e.g. 100,000 impressions, or 20 contextually different ads) could vary and the web page or pages on which these ads are displayed can vary. Both or either of these aspects could be factored into the price as well. For example there could be a different price for an ad 404 located on the front page of a website versus a front page of a section of a website (e.g. the variety section of a newspaper website) versus a non-front page of a website. Ad(s) 404 displayed on highly frequented pages of the website could be offered at a different price than those displayed on pages that are frequented less often.

The previous examples illustrate various possible combination ages of ads 404 and 402 which can be offered. Those skilled in the art will recognize that this is not an exhaustive list. Many combinations exist that were not listed, which also fall within the scope of the invention. Additionally, there are many aspects of the combination package other than toe listed that could be employed to differentiate the price of the various packages.

When the ad system 106 is contacted because an end user is attempting to access a content provider's website 104, the ad system 106 selects and returns the advertiser's fixed placement advertisement and if appropriate, one or more contextually relevant advertisements 404. Ad system 106 may track the number of instances of contextually relevant advertisements 404 a it provides for an advertiser, relative to a particular content provider 104. Once ad system 106 determines that the a upon number of contextually relevant advertisements have been displayed, it can stop providing those advertisements in response to subsequent requests for advertisement.

Thus it is seen that systems and methods are provided for selling, selecting and displaying advertisements over the Internet. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the present invention. The computer system may be any suitable apparatus, system or device, electronic, optical, or a combination thereof. For example, the computer system may be a programmable data processing apparatus, a general purpose computer, a Digital Signal Processor, an optical computer or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by one or more application specific integrated circuits and/or optical elements. Suitably, the computer program can be stored on a carrier medium in computer usable form, which is also envisaged as aspect of the present invention. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize program to configure it for operation. The computer program may also be supplied from a remote source embodied in a carrier medium such as an electronic signal, including a radio frequency carrier wave or an optical carrier wave.

What is claimed is:

1. A system for selecting and displaying advertisements over a network, the system comprising:
    a database configured to store a plurality of advertisements associated with an advertiser; and
    an advertisement selection server configured to:
        receive a request for advertising content from a user computer over the network, the request comprising a selection criteria associated with a web page of a website accessed by the user computer;
        obtain a plurality of advertisements from the database, based on at least the selection criterion;
        generate contextual information associated with the obtained advertisements, the contextual information indicating a relevance of the obtained advertisements to content within the web page;
        select, from the obtained advertisements, a first advertisement for display at a predetermined location within the web page and a second advertisement for display at a location within the web page that is contextually relevant to the second advertisement, the selection being based on at least the contextual information; and
        transmit at least the first advertisement and the second advertisement to the user computer, wherein the user computer is configured to display the first advertisement at the predetermined location and to display the second advertisement at the contextually-relevant location.

2. The system of claim 1, wherein the first advertisement comprises a text portion and a graphics portion.

3. The system of claim 1, wherein the second advertisement comprises a text advertisement.

4. The system of claim 1, wherein the second advertisement is derived from a portion of the first advertisement.

5. The system of claim 1, wherein the advertisement selection server is further configured to:
receive a successive request for advertising content from the user computer;
based on the successive request, identify a successive location within the website for display of the first advertisement; and
transmit the first advertisement and the successive location to the user computer, wherein the user computer is configured to display the first advertisement at the successive location within the website.

6. The system of claim 1, wherein the advertisement selection server is further configured to:
identify a number of successive requests for advertising content received from the user computer;
determine whether then number of successive requests exceeds a threshold value; and
transmit the second advertisement to the user computer, when the number of successive requests fails to exceed the threshold value.

7. The system of claim 1, wherein:
the website comprises a plurality of web pages; and
the advertisement selection server is further configured to:
select a plurality of first advertisements from the obtained advertisements; and
transmit at least the first advertisements to the user computer, the user computer being further configured to display the first advertisements at corresponding predetermined locations within the web pages.

8. The system of claim 1, wherein:
the web site comprises a plurality of web pages; and
the advertisement selection server is further configured to:
select a plurality of second advertisements from the obtained advertisements; and
transmit at least the second advertisements to the user computer, the user computer being further configured to display the second advertisements at locations within the web pages, the locations being contextually relevant to corresponding ones of the second advertisements.

9. The system of claim 1, wherein:
a plurality of locations within the web page are contextually relevant to the second advertisement; and
the user computer is further configured to display the second advertisement proximate to at least a subset of the locations.

10. The system according to claim 1, wherein:
the request is generated by the user computer in accordance with instructions provided to the user computer by a content publisher; and
the instructions comprise markup code provided to the user computer in response to an HTTP (HyperText Transfer Protocol) request to access page submitted to the content published by the user computer.

11. A system providing advertisements, comprising:
a database configured to store content associated with a website of a content publisher: and
a content publisher server configured to:
receive a request from a user computer to access a web page associated with the website;
in response to the request, obtain a portion of the stored content associated with the web page;
generate instructions that direct the user computer to request, from an advertisement selection system, a first advertisement for display at a predetermined location within the web page and a second advertisement for display at a location within the web page that is contextually relevant to the second advertisement; and
transmit the stored content portion and the instructions to the user computer, the instructions comprising information identifying the predetermined location and the contextually-relevant location.

12. The system of claim 11, wherein the instructions further comprise a plurality of contextually-relevant locations for the second advertisement.

13. The system of claim 11, wherein the stored content portion and the instructions form at least part of an HTTP (HyperText Transfer Protocol) response.

14. A computer-implemented method for selecting and displaying advertisements within a website, comprising:
receiving, from a user computer, a request for advertising content of an advertiser, the request comprising a selection criteria associated with a web page accessed by the user computer;
obtaining, in response to the request, a plurality of advertisements associated with the advertiser, based on at least the selection criterion;
generating contextual information associated with the obtained advertisements, the contextual information indicating a relevance of the obtained advertisements to content within the web page;
selecting, from the obtained advertisements, a first advertisement for display at a predetermined location within the web page and a second advertisement for display at a location within the web page that is contextually relevant to the second advertisement, the selection being based on at least the contextual information; and
transmitting at least the first advertisement and the second advertisement to the user computer, wherein the user computer is configured to display the first advertisement at the predetermined location and to display the second advertisement at the contextually-relevant location.

15. The method of claim 14, wherein:
the website includes a plurality of web pages; and
the user computer is configured to display the first advertisement at a predetermined location within a first one of the web pages, and to display the second advertisement at a location within a second one of the web pages that is contextually relevant to the second advertisement.

16. The method of claim 14, wherein:
the selecting comprises selecting a plurality of first advertisements; and
the method further comprises transmitting the first advertisements to the user computer, wherein the user computer is further configured to display the first advertisements within the predetermined portion of the web page.

17. The method of claim 14, wherein:
the selecting comprises selecting a plurality of second advertisements; and
the method further comprises transmitting the second advertisements to the user computer, wherein the user computer is configured to display the second advertisements at locations within the web page, the locations being contextually relevant to corresponding ones of the second advertisements.

18. The method of claim 14, wherein the user computer is configured to display the second advertisement at a plurality of locations within the web page, the locations being contextually relevant to the second advertisement.

19. A method of selling advertising for a website of a content provider over network comprising:

creating a package of advertisements, the package comprising a first advertisement and a second advertisement, the creating comprising:
  obtaining information associated with a plurality of advertisements;
  generating contextual information associated with the obtained advertisements, the contextual information indicating a relevance of the obtained advertisements to content within the web page; and
  selecting, from the obtained advertisements, and based on at least the contextual information, a first advertisement for display at a predetermined location within the website, and a second advertisement for display at a location within the website that is relevant to the second advertisement; and
offering the package of advertisements for purchase via said network.

20. The method of claim 19, wherein the package comprises a plurality of first advertisements.

21. The method of claim 19, wherein the package comprises a plurality of 1 second advertisements.

22. The method of claim 19, wherein the package further comprises information identifying a predetermined duration of time to display first advertisement and a predetermined number of displays of the second advertisement.

23. The system of claim 1, wherein the selection criteria comprises at least one of an advertisement size or an advertisement format.

24. The method of claim 14, wherein the selection criteria comprises at least one of an advertisement size or an advertisement format.

25. A tangible, non-transitory computer-readable medium storing instructions that, when executed by a processor, perform a method comprising the steps of:
  receiving, from a user computer, a request for advertising content of an advertiser, the request comprising a selection criteria associated with a web page accessed by the user computer;
  obtaining, in response to the request, a plurality of advertisements associated with the advertiser, based on at least the selection criterion;
  generating contextual information associated with the obtained advertisements, the contextual information indicating a relevance of the obtained advertisements to content within the web page;
  selecting, from the obtained advertisements, a first advertisement for display at a predetermined location within the web page and a second advertisement for display at a location within the web page that is contextually relevant to the second advertisement, the selection being based on at least the contextual information; and
  transmitting at least the first advertisement and the second advertisement to the user computer, wherein the user computer is configured to display the first advertisement at the predetermined location and to display the second advertisement at the contextually-relevant location.

* * * * *

UNITED STATES PATENT AND TRADEMARK OFFICE
CERTIFICATE OF CORRECTION

PATENT NO. : 8,412,571 B2
APPLICATION NO. : 12/028937
DATED : April 2, 2013
INVENTOR(S) : Anthony Joseph Wills et al.

It is certified that error appears in the above-identified patent and that said Letters Patent is hereby corrected as shown below:

In the Claims

Claim 21, col. 13, line 22, "a plurality of 1 second advertisements" should read --a plurality of second advertisements--.

Signed and Sealed this
Thirtieth Day of July, 2013

Teresa Stanek Rea
*Acting Director of the United States Patent and Trademark Office*